United States Patent
Ohtsuki et al.

(10) Patent No.: US 8,157,453 B2
(45) Date of Patent: Apr. 17, 2012

(54) BEARING DEVICE FOR WHEEL

(75) Inventors: Hisashi Ohtsuki, Iwata (JP); Hiroto Suma, Iwata (JP)

(73) Assignee: NTN Corporation, Osaka (JP)

( * ) Notice: Subject to any disclaimer, the term of this patent is extended or adjusted under 35 U.S.C. 154(b) by 650 days.

(21) Appl. No.: 12/085,568

(22) PCT Filed: Dec. 13, 2006

(86) PCT No.: PCT/JP2006/324796
§ 371 (c)(1),
(2), (4) Date: May 28, 2008

(87) PCT Pub. No.: WO2007/069620
PCT Pub. Date: Jun. 21, 2007

(65) Prior Publication Data
US 2009/0304319 A1  Dec. 10, 2009

(30) Foreign Application Priority Data

Dec. 16, 2005 (JP) ................................ 2005-363755
Nov. 2, 2006 (JP) ................................ 2006-299232

(51) Int. Cl.
*F16C 13/00* (2006.01)
(52) U.S. Cl. ........................................ 384/589; 384/574
(58) Field of Classification Search .................. 384/544, 384/571, 572, 574, 575, 589; 301/105.1
See application file for complete search history.

(56) References Cited

U.S. PATENT DOCUMENTS

| 1,402,071 A * | 1/1922 | Huther ........................... 384/571 |
| 3,144,284 A * | 8/1964 | Ortegren ........................ 384/574 |
| 4,700,443 A | 10/1987 | Schalk |
| 4,837,909 A | 6/1989 | Schalk |
| 5,037,214 A * | 8/1991 | Dougherty ..................... 384/571 |
| 6,135,643 A | 10/2000 | Hattori et al. |
| 6,280,093 B1 * | 8/2001 | Ohtsuki et al. ................. 384/448 |
| 7,757,402 B2 * | 7/2010 | Seo et al. ..................... 29/898.07 |

(Continued)

FOREIGN PATENT DOCUMENTS

DE  198 33 436   2/1999

(Continued)

OTHER PUBLICATIONS

Supplementary European Search Report dated Mar. 29, 2010 in corresponding European Application No. 06834551.1.

(Continued)

*Primary Examiner* — James Pilkington
(74) *Attorney, Agent, or Firm* — Wenderoth, Lind & Ponack, L.L.P.

(57) ABSTRACT

In an assembly of retainers and tapered rollers to be easily incorporated into an outer ring having a rib portion on an inner peripheral surface on an outboard side thereof, recesses are formed in a large end surface and a small end surface of an outboard side tapered roller. Projections to be inserted into the recesses are formed in an outboard side retainer. A diameter of a circumcircle of the tapered rollers before they are inserted into a hub ring is smaller than an inner diameter of a rib portion. When a hub ring is inserted into the outer ring, the tapered rollers move in a radial direction to cause the diameter of the circumcircle to be greater than the inner diameter dimension of the rib portion, and as a result, the tapered rollers can be received in a specified position.

4 Claims, 11 Drawing Sheets

U.S. PATENT DOCUMENTS

| | | | |
|---|---|---|---|
| 2003/0142893 A1* | 7/2003 | Joki et al. | 384/572 |
| 2007/0031079 A1* | 2/2007 | Komori et al. | 384/589 |

FOREIGN PATENT DOCUMENTS

| | | |
|---|---|---|
| DE | 202 09 017 | 2/2003 |
| EP | 0 171 096 | 2/1986 |
| JP | 49-34844 | 9/1974 |
| JP | 54-150535 | 11/1979 |
| JP | 56-119015 | 9/1981 |
| JP | 11-44322 | 2/1999 |
| JP | 2000-055056 | 2/2000 |
| JP | 2000-145789 | 5/2000 |
| JP | 2004-084705 | 3/2004 |
| JP | 2005-291499 | 10/2005 |
| WO | WO2004/101295 * | 11/2004 |

OTHER PUBLICATIONS

International Search Report mailed Mar. 20, 2007 for International Application No. PCT/JP2006/324796.

* cited by examiner

Y ≥ X

BEARING DEVICE FOR WHEEL

TECHNICAL FIELD

The present invention relates to a bearing device for a wheel.

BACKGROUND ART

As shown in FIG. 8, a hub unit system equipped with a hub ring 101 and an outer ring 103 is known as a bearing device for a wheel (Patent Document 1 and Patent Document 2). This bearing device for a wheel is equipped with the hub ring 101, an inner ring 102 fitted onto the hub ring 101, the outer ring 103 arranged in the outer periphery of the hub ring 101 and the inner ring 102, tapered rollers 104a and 104b respectively arranged between the outer ring 103 and the hub ring 101 and between the outer ring 103 and the inner ring 102, and retainers 106a and 106b having pockets retaining the tapered rollers 104a and 104b, respectively.

The outer ring 103 has an outer race 107 on the outboard side and an outer race 108 on the inboard side, and the hub ring 101 has an inner race 109 opposed to the outer race 107 on the outboard side of the outer ring 103 and a small diameter portion 110 with which the inner ring 102 is fit-engaged. Further, the inner ring 102 has on the outer peripheral surface thereof an inner race 113 opposed to the outer race 108 on the inboard side of the outer ring 103.

Generally speaking, a bearing device for a wheel of this type is assembled as follows. First, as shown in FIG. 10, the tapered rollers 104a and the retainer 106a on the outboard side are incorporated into the outer ring 103, thus effecting transition from the state of FIG. 9 to that of FIG. 10. After that, a seal member 112a is assembled to the outboard side of the outer ring 103.

Next, as shown in FIG. 11, the hub ring 101 is incorporated into the inner side of the outer ring 103, to which the tapered rollers 104a, the retainer 106a, and the seal member 112a have been assembled. After that, the tapered rollers 104b and the retainer 106b on the inboard side formed into an assembly 111b beforehand (hereinafter, this assembly will be referred to as the "roller assembly") are assembled to the inner ring 102, which has the inner race 113 on the outer peripheral surface thereof, and the resultant assembly is externally fitted to the small diameter portion 110 before the seal member 112b is assembled. After that, an inboard side end portion 114 of the outer ring 103 is swaged from the outer side, whereby, as shown in FIG. 8, the inner ring 102 is held between a step portion 115 of the hub ring 101 and a swaged portion 116 of the hub ring 101.
(Patent Document 1) JP 11-44322 A
(Patent Document 2) DE 20209017 U1

SUMMARY OF THE INVENTION

Problem to be Solved by the Invention

As described above, in a so-called third-generation tapered hub bearing, in which a rib portion 117 is provided on the outboard side of the outer ring 103, it is possible, on the inboard side, to assemble a roller assembly beforehand and then incorporate it into the outer ring. On the outboard side, however, it is impossible to prepare a roller assembly 111a beforehand and then incorporate it into the outer ring 103. As shown in FIG. 8, when the roller assembly 111a is prepared beforehand, a diameter A of the circumcircle of the tapered rollers 104a is larger than an inner diameter B of the rib portion 117, so, in this state, the roller assembly 111a and the rib portion 117 interfere with each other, thus making it impossible to incorporate the roller assembly.

In view of this, as shown in FIG. 12, in the related art, the retainer 106a is first incorporated into the outer ring 103, and then one or a plurality of tapered rollers 104a are fitted into the retainer 106a from the inner side of the retainer 106a. This method has a problem in that it is rather poor in assembly workability and that it requires a complicated assembly jig (assembly device).

In view of the above-mentioned problem, it is an object of the present invention to provide a bearing device for a wheel, which allows the outboard side roller assembly to be easily incorporated into the outer ring having a rib portion on an inner peripheral surface on the outboard side thereof, thereby helping to achieve an improvement in terms of assembly workability.

Means for Solving the Problem

A bearing device for a wheel of the present invention includes: a hub wheel; an inner ring fitted onto the hub ring; an outer ring; outboard side tapered rollers provided between the outer ring and the hub ring; inboard side tapered rollers provided between the outer ring and the inner ring; and outboard side retainer and inboard side retainer having pockets retaining the tapered rollers, with a rib portion being provided on the outboard side of an inner peripheral surface of the outer ring, in which radial relative movement is allowed between the tapered rollers and the retainer on the outboard side, and in which a circumcircle diameter of the a row of outboard side tapered roller can assume a dimension which is not larger than an inner diameter dimension of the rib portion and a dimension which is larger than the inner diameter dimension of the rib portion.

In this construction, when, in the assembly stage prior to the insertion of the hub ring, the circumcircle diameter of the tapered roller row on the outboard side is set to be not larger than the inner diameter dimension of the rib portion (i.e., the circumcircle diameter is set to be equal to or smaller than the inner diameter dimension of the hub ring), it is possible to incorporate the previously prepared roller assembly into the outer ring from the outboard side even when a rib portion is provided on the outer ring. When, after that, the hub ring is inserted into the inner periphery of the outer ring, the tapered rollers move outwardly, and the circumcircle diameter of the tapered roller row becomes larger than the inner diameter dimension of the rib portion. As a result, each tapered roller is received at the normal position, and the incorporation of the roller assembly on the outboard side is completed. Here, the term "circumcircle diameter" means the diameter of the circle circumscribing the outer peripheral edges of the large end surfaces of a plurality of tapered rollers arranged circumferentially.

In this construction, in order to prevent detachment of the rollers, it is desirable to provide a projection on one of each of the end surfaces of each outboard side tapered roller and the surface of the retainer opposed to that end surface, and to provide a recess in another thereof, with the projection and the recess being radially engaged with each other to restrict relative inward movement of each tapered roller. Similar movement restriction can also be effected by holding the outer peripheral surfaces of the outboard side tapered rollers in contact with the surfaces of the retainer opposed thereto (the inner surfaces of the pockets opposing thereto in the circumferential direction). In the present invention, however, there is generated a large difference in the radial position of the tapered rollers before and after the incorporation of the roller assembly into the outer ring, so, in order to reliably effect inward movement restriction, an increase in the wall thickness of the retainer is inevitable, resulting in an increase in the bearing size. In contrast, in the above-mentioned construction, it is possible to avoid such a problem.

By making the inner diameter dimension of the minimum inner diameter portion of the outboard side retainer slightly larger than the outer diameter dimension of the outer peripheral surface of the hub ring opposed thereto, it is possible to impart an aligning action to the retainer after assembly, thereby preventing offset of the retainer.

By making the outer diameter dimension of the maximum outer diameter portion of the outboard side retainer slightly smaller than the inner diameter dimension of the rib portion of the outer ring, it is possible to reliably insert the retainer into the outer ring without involving any interference with the rib portion. Further, it is possible to prevent offset of the retainer after assembly.

Effects of the Invention

According to the present invention, even when a rib portion is provided on the outer ring, it is possible to incorporate the outboard side roller assembly into the outer ring. Further, through the insertion of the hub ring into the outer ring, each tapered roller moves outwardly to be received at the normal position. Thus, the assembly workability is improved, making it possible to attain an enhancement in productivity. Further, no complicated assembly device is required, thus contributing to a reduction in cost.

Figure 1:
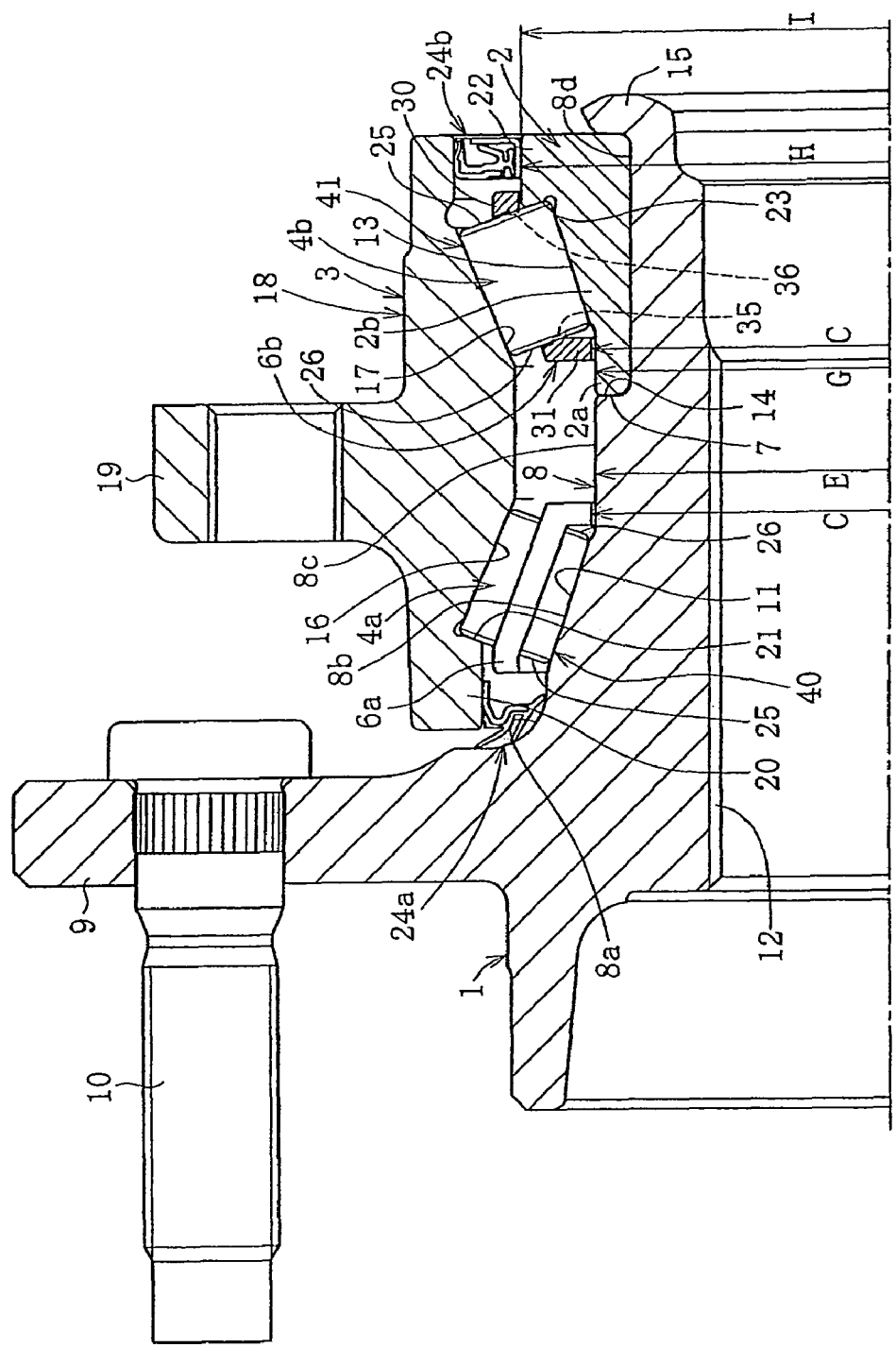
FIG. 1 is a sectional view of a bearing device for a wheel according to an embodiment of the present invention.

DESCRIPTION OF SYMBOLS 1 hub ring
2 inner ring
2a small diameter portion
2b tapered portion
3 outer ring
5 pocket
6a, 6b retainer
7 inner end surface
8 hub ring main body
8b tapered portion
8c medium diameter portion
8d small diameter portion
9 flange section
10 bolt member
11, 13 inner race
12 spline hole
14 step surface
15 swaged portion
16, 17 outer race
18 outer ring main body
19 flange section
20 rib portion
21, 23 rib surface
22 rib portion
24a, 24b seal member
25 large end surface
26 small end surface
27, 28 recess
30 large diameter ring portion
31 small diameter ring portion
32 pillar portion
33, 34 axial end surface
35, 36 projection
40, 41 roller assembly

DETAILED DESCRIPTION OF THE INVENTION

In the following, an embodiment of the present invention is described with reference to FIGS. 1 through 7.

As shown in FIG. 1, a bearing device for a wheel is equipped with a hub ring 1 (i.e., a hub wheel), an inner ring 2 fitted onto the hub ring 1, an outer ring 3 arranged in the periphery of the hub ring 1 and the inner ring 2, outboard side tapered rollers 4a provided between the outer ring 3 and the hub ring 1, inboard side tapered rollers 4b provided between the outer ring 3 and the inner ring 2, and outboard side and inboard side retainers 6a and 6b having pockets 5 for retaining the tapered rollers 4a and 4b, respectively.

The hub ring 1 is equipped with a cylindrical hub ring main body 8 having a small diameter portion 8d on the inboard side, and a flange section 9 provided on the outboard side of the hub ring main body 8. The hub ring 1 is mounted to a wheel (not shown) through the intermediation of a bolt member 10 passed through a through-hole provided in the flange section 9. On the outer peripheral surface of the hub ring main body 8, there is formed an inner race 11 on which the outboard side tapered rollers 4a roll. The hub ring main body 8, which is on the inboard side with respect to the flange section 9, has a portion 8a opposed to a first seal member 24a described below, a tapered portion 8b forming the inner race 11, a medium diameter portion 8c, and the above-mentioned small diameter portion 8d. At the center of the hub ring 1, there is provided a spline hole 12 for spline connection with an outer ring stem portion of a constant velocity universal joint. The inner race 11 provided on the hub ring 1 including a tapered surface gradually reduced in diameter from the outboard side toward the inboard side.

The inner ring 2 includes a short cylindrical member having on its outer peripheral surface an inner race 13 on which the inboard side tapered rollers 4b roll, and is fit-engaged with the small diameter portion 8d of the hub ring main body 8. The inner ring 2 has a small diameter portion 2a, a tapered portion 2b constituting the inner race 13, and a rib portion 22. In the state in which the inner ring 2 is fit-engaged with the hub ring main body 8, an inner end surface 7 of the inner ring 2 abuts a step surface 14 of the hub ring 1. The inboard side end portion of the hub ring main body 8 is swaged from the outer side to become a swaged portion 15. Thus, the inner ring 2 is fixed to the hub ring 1 so as not to move in the axial direction. The inner race 13 of the inner ring 2 includes a tapered surface gradually reduced in diameter from the inboard side toward the outboard side.

The outer ring 3 is equipped with an outer ring main body 18 having a first outer race 16 on the outboard side and a second outer race 17 on the inboard side, and a flange section 19 outwardly protruding from the outer ring main body 18. An inwardly protruding rib portion 20 is provided on the inner peripheral surface of the outboard side end portion of the outer ring main body 18. The outer ring 3 is mounted to a vehicle body (not shown) through the intermediation of a bolt member (not shown) passed through a through-hole provided in the flange section 19.

The first outer race 16 includes a tapered surface gradually reduced in diameter from the outboard side toward the inboard side, and faces the inner race 11 of the hub ring 1, with the tapered rollers 4a existing between the inner race 11 and the outer race 16. The second outer race 17 includes a tapered surface gradually reduced in diameter from the inboard side toward the outboard side, and faces the inner race 13 of the inner ring 2, with the tapered rollers 4b existing between the inner race 13 and the outer race 17.

Sealing is effected between the outboard side end portion of the outer ring 3 and the hub ring main body 8 of the hub ring 1 by the first seal member 24a, and sealing is effected between the inboard side end portion of the outer ring 3 and the inner ring 2 by a second seal member 24b.

Figure 2:
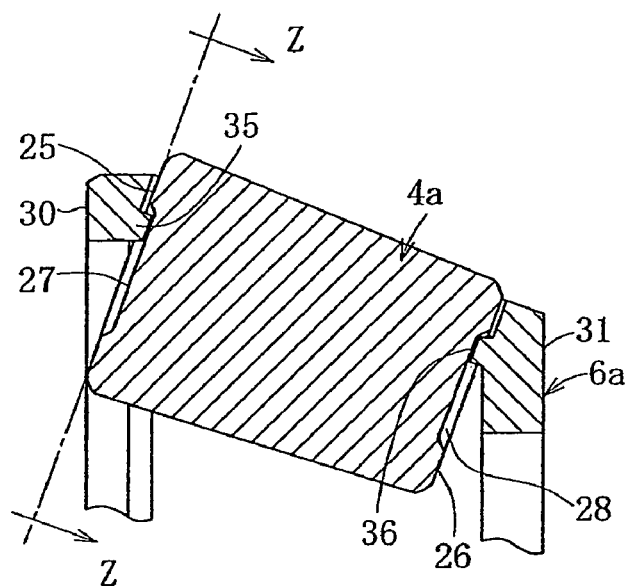
FIG. 2 is an enlarged sectional view illustrating the relationship between a tapered roller and a retainer in the bearing device for a wheel.
Figure 3:
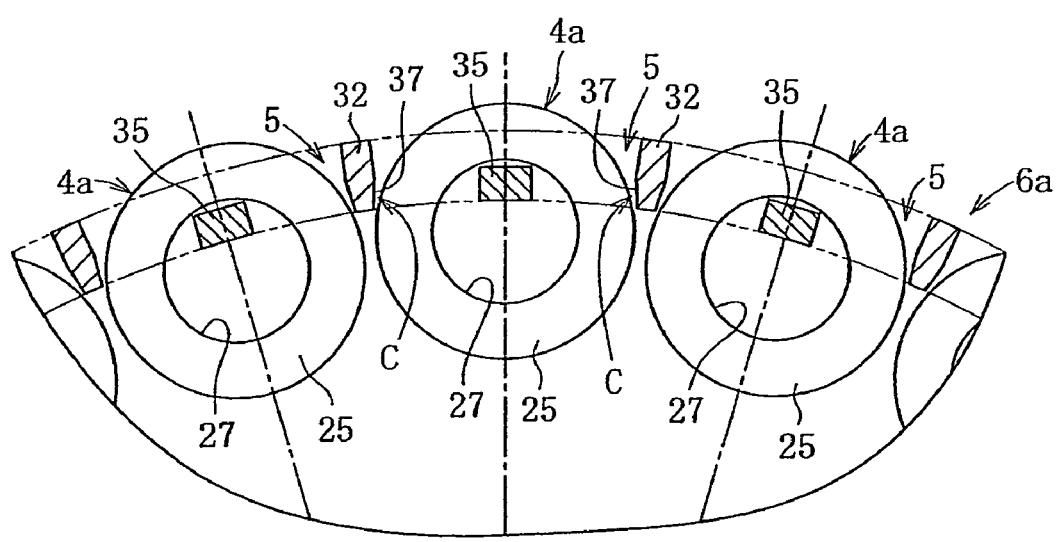
FIG. 3 is a sectional view taken along the line Z-Z of FIG. 2.
Figure 4:
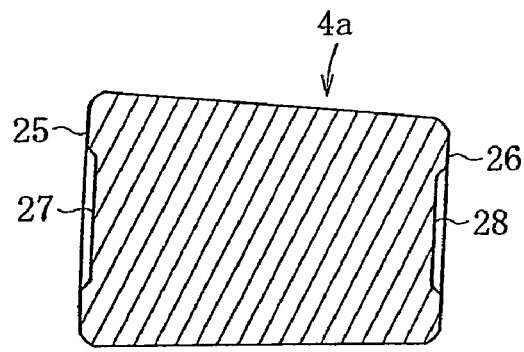
FIG. 4 is an enlarged sectional view of a tapered roller in the bearing device for a wheel.

As shown in FIGS. 2 through 4, in a large end surface 25 and a small end surface 26 of each outboard side tapered roller 4a, there are respectively provided circular recesses 27 and 28 whose centers coincide with the roller center. Each inboard side tapered roller 4b also has recesses 27 and 28 in the large end surface 25 and the small end surface 26, respectively.

Figure 5:
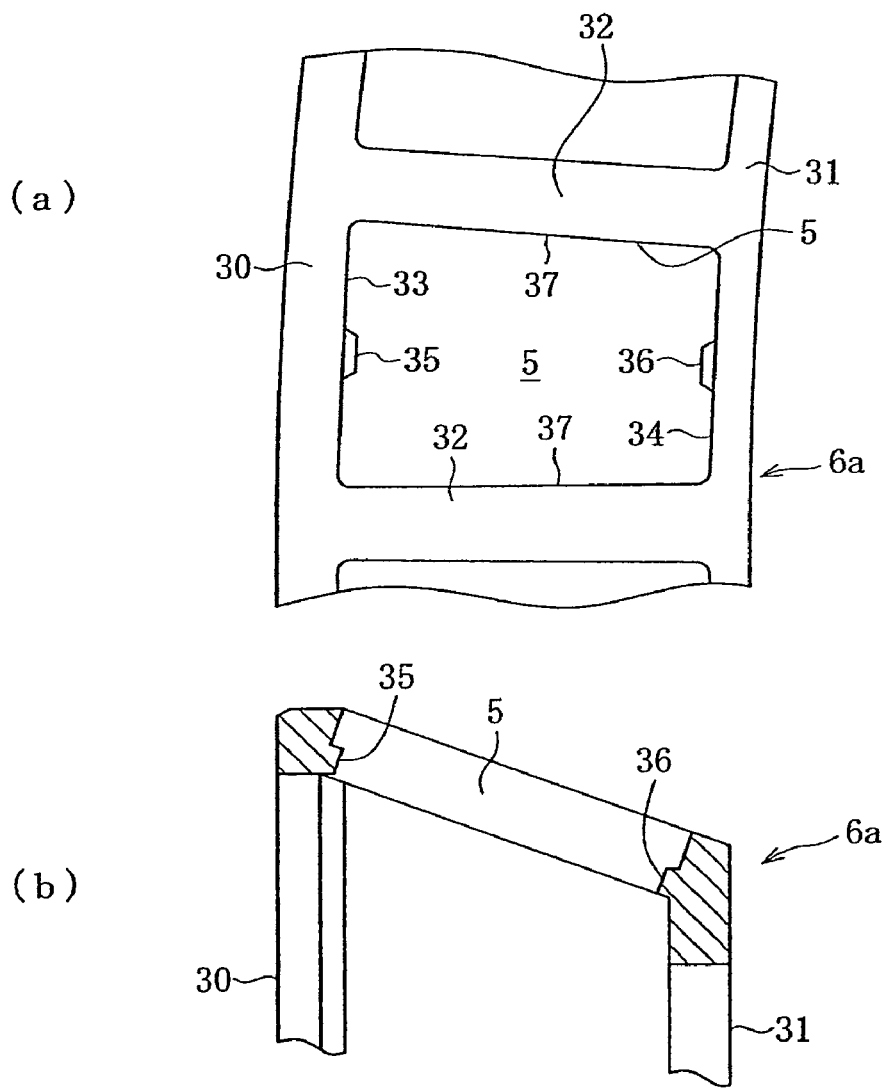
FIG. 5 are diagrams each illustrating a retainer in the bearing device for a wheel, of which portion (a) is a developed view, and portion (b) is an enlarged main portion sectional view.

As shown in FIG. 5, each of the retainers 6a and 6b has a large diameter ring portion 30, a small diameter ring portion 31, and a plurality of pillar portions 32 connecting the large diameter ring portion 30 and the small diameter ring portion 31, with pockets 5 accommodating the tapered rollers 4a, 4b being provided between the adjacent pillar portions 32 and 32.

Of the inner surfaces of each pocket 5, surfaces 33 and 34 (axial surfaces) opposed to the large end surface 25 and the small end surface 26 of each tapered roller are provided with projections 35 and 36 to be inserted into the recesses 27 and 28 of the tapered roller 4a, 4b. As shown in FIG. 3, of the inner surfaces of each pocket 5, surfaces 37 opposed to each other in the circumferential direction (circumferential surfaces) define pocket gaps C between themselves and the outer peripheral surface of each tapered roller 4a, 4b, and each tapered roller 4a, 4b can move outwardly until its outer peripheral surface comes into contact with the circumferential surfaces 37 to reduce the pocket gaps C to zero. Inward movement of each tapered roller 4a, 4b is restricted through radial engagement between the projections 35 and 36 and the outer peripheral wall surfaces of the recesses 27 and 28. At this time, the outer peripheral surface of each tapered roller 4a, 4b and the circumferential surfaces 37 of each pocket 5 are not in contact with each other, leaving the pocket gaps C therebetween.

Figure 6:
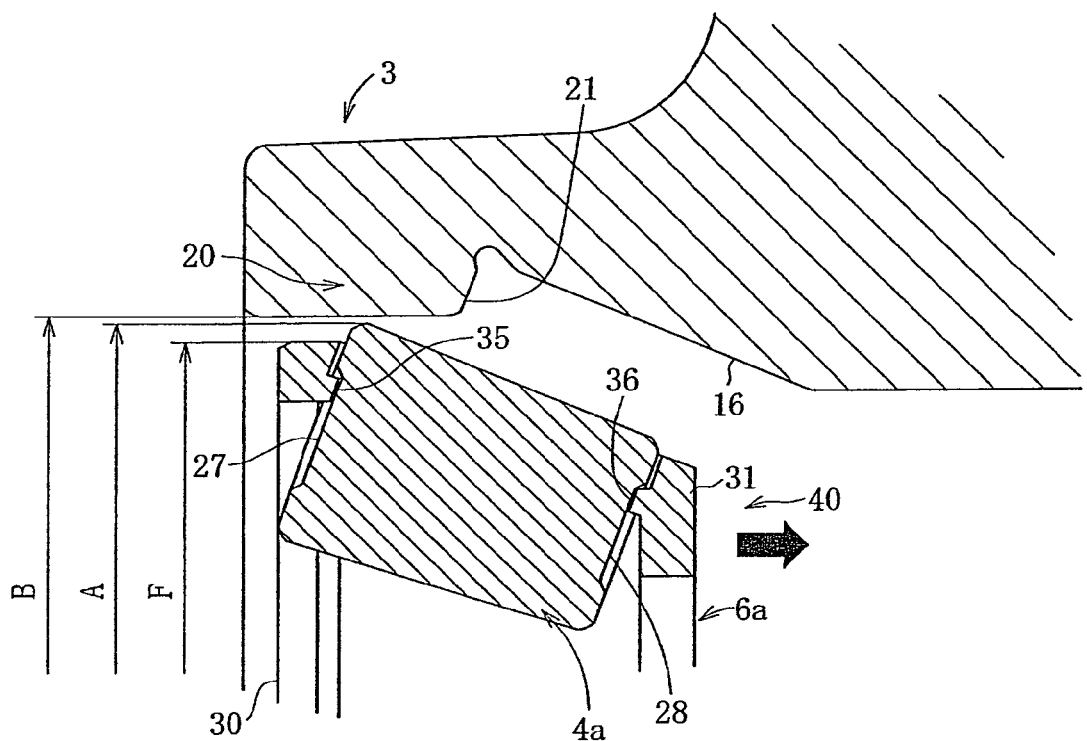
FIG. 6 is an enlarged main portion sectional view illustrating how the bearing device for a wheel is assembled.

As shown in FIGS. 1 and 6, in this bearing device for a wheel, the inner diameter dimension C of the minimum inner diameter portion (small diameter ring portion 31) of the outboard side retainer 6a is slightly larger than an outer diameter dimension E of the outer peripheral surface of the hub ring 1 opposed to this minimum inner diameter portion. On the inboard side with respect to this portion, the outer diameter dimension of the hub ring 1 is smaller than the minimum inner diameter dimension C of the retainer 6a. An outer diameter dimension F of the maximum outer diameter portion of the outboard side retainer 6a is slightly smaller than the inner diameter dimension B of the rib portion 20 of the outer ring 3. Further, the inner diameter dimension C of the minimum inner diameter portion (small diameter ring portion 31) of the inboard side retainer 6b is slightly larger than an outer diameter dimension G of the small diameter portion 2a of the inner ring 2, and an inner diameter dimension H of the large diameter ring portion 30 of the retainer 6b is slightly larger than an outer diameter dimension I of the rib portion 22 of the inner ring 2. With this construction, it is possible to achieve an improvement in terms of incorporation property, and to prevent offset of the retainer 6a, 6b, making it possible to provide smooth rotation over a long period of time.

Next, a method of assembling the bearing device for a wheel, constructed as described above, will be illustrated. First, each tapered roller 4a, 4b is assembled to the retainer 6a, 6b to assemble an outboard side roller assembly 40 and an inboard side roller assembly 41, respectively, and each roller assembly 40, 41 is assembled to the outer ring 3. In this process, the outboard side roller assembly 40 is inserted through an outboard side opening, and the inboard side roller assembly 41 is inserted through an inboard side opening.

On the inboard side, the opening of the outer ring 3 has a large diameter. Further, the second outer race 17 is a tapered surface gradually reduced in diameter from the inboard side toward the outboard side. Thus, the roller assembly 41 can be inserted easily.

On the other hand, on the outboard side, the outer ring 3 has the rib portion 20, so, when incorporating the roller assembly 40, there is used, as shown in FIG. 6, an appropriate jig to make the circumcircle diameter A of the tapered roller row 4a smaller than the inner diameter dimension B of the rib portion 20 of the outer ring 3. When, in this state, the roller assembly 40 is forced-in in the direction of the arrow of FIG. 6, it is possible to smoothly assemble the roller assembly 40 to the inner side of the outer ring 3 without involving any interference with the rib portion 20 of the outer ring 3.

Next, the hub ring 1 is inserted from the outboard side into the inner side of the outer ring 3, into which the roller assemblies 40 and 41 have been incorporated. Since, on the inboard side, the inner diameter dimension of the small diameter ring portion 31 of the retainer 6b is set larger than the outer diameter dimension of the small diameter portion 8d of the hub ring 1, the small diameter portion 8d can be easily inserted into the inner side of the inboard side retainer 6b.

Figure 7:
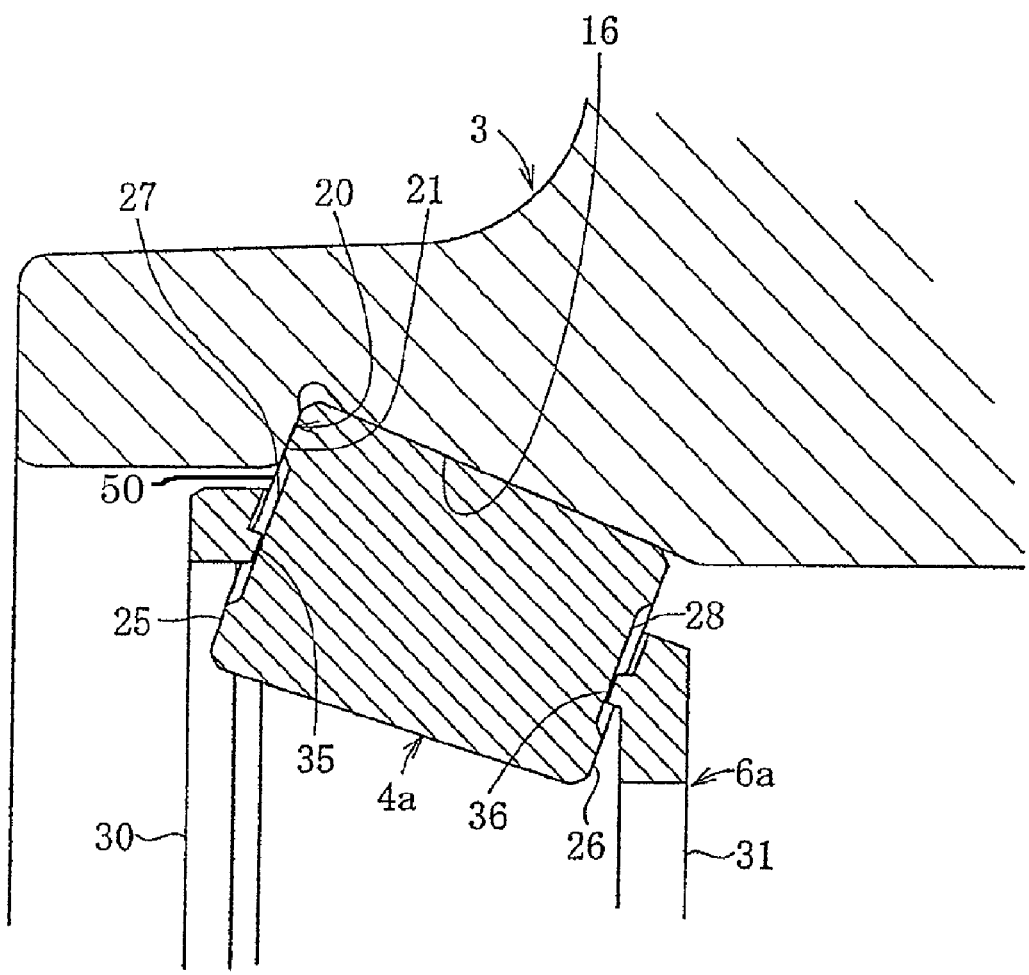
FIG. 7 is an enlarged main portion sectional view illustrating how the bearing device for a wheel is assembled.
Figure 8:
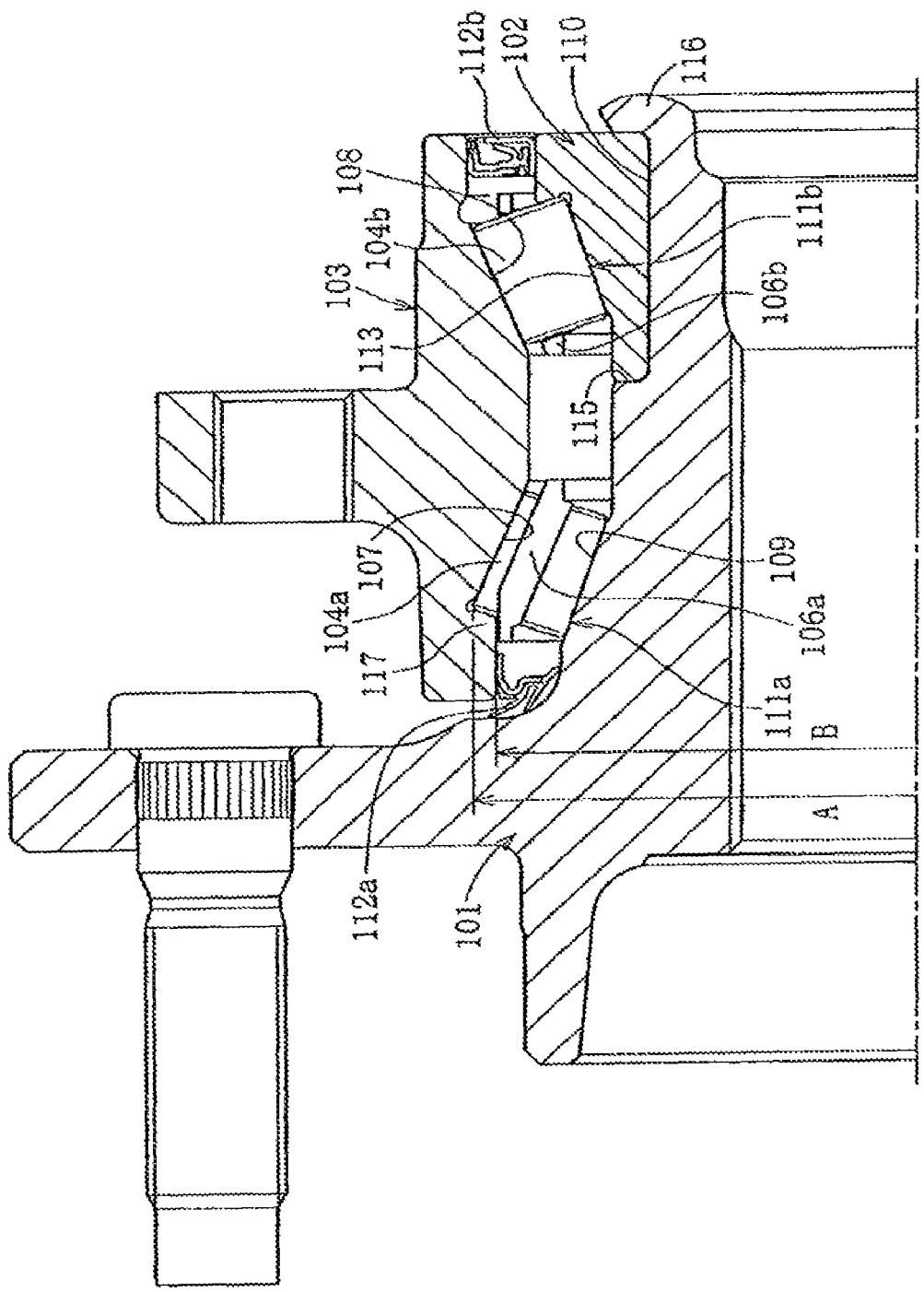
FIG. 8 is a sectional view of a conventional bearing device for a wheel.
Figure 9:
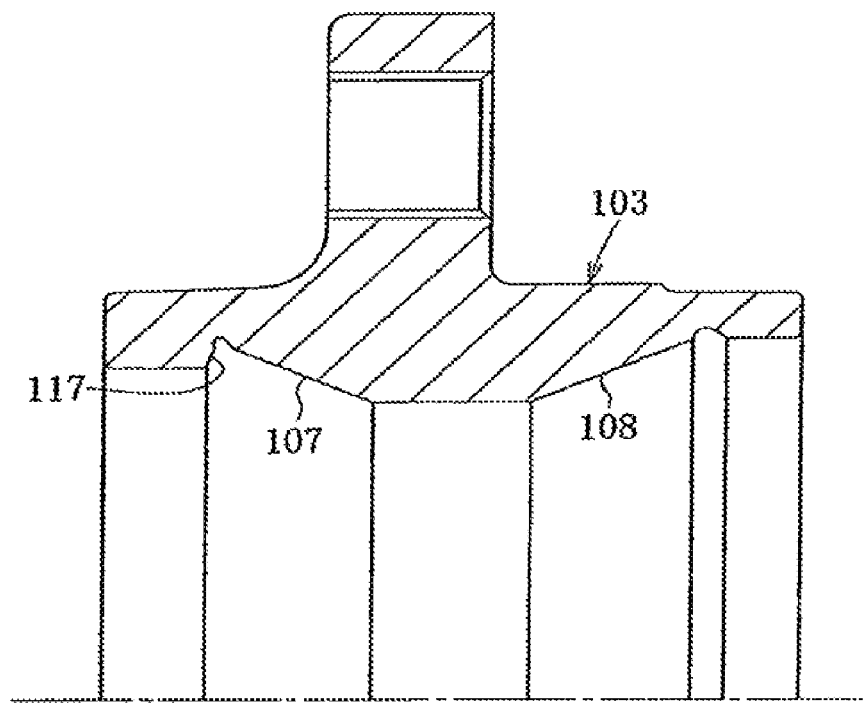
FIG. 9 is a sectional view of the outer ring for the conventional bearing device for a wheel.
Figure 10:
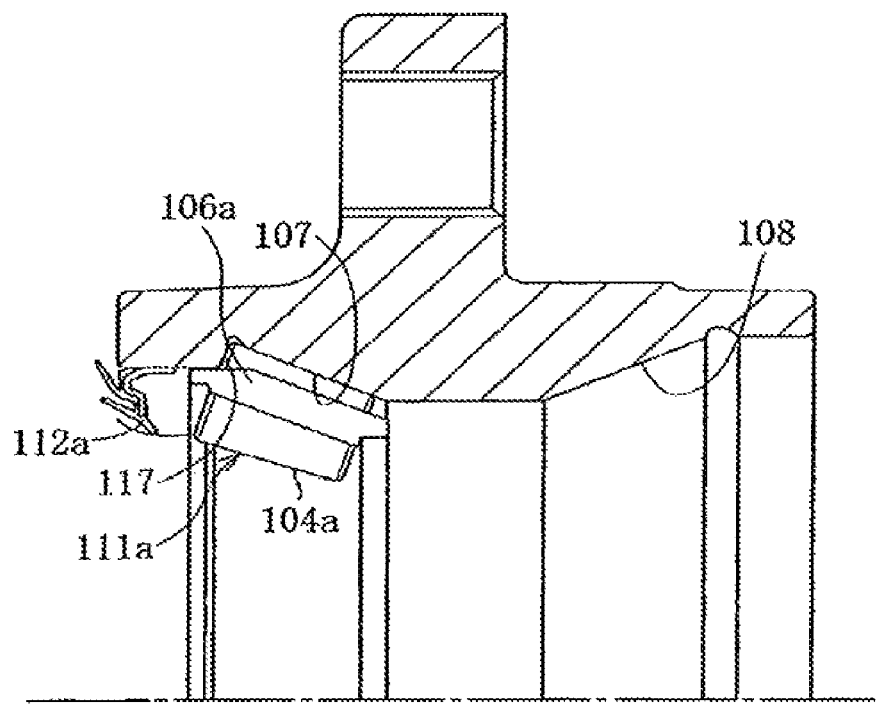
FIG. 10 is a main portion sectional view illustrating the conventional bearing device for a wheel as being assembled.
Figure 11:
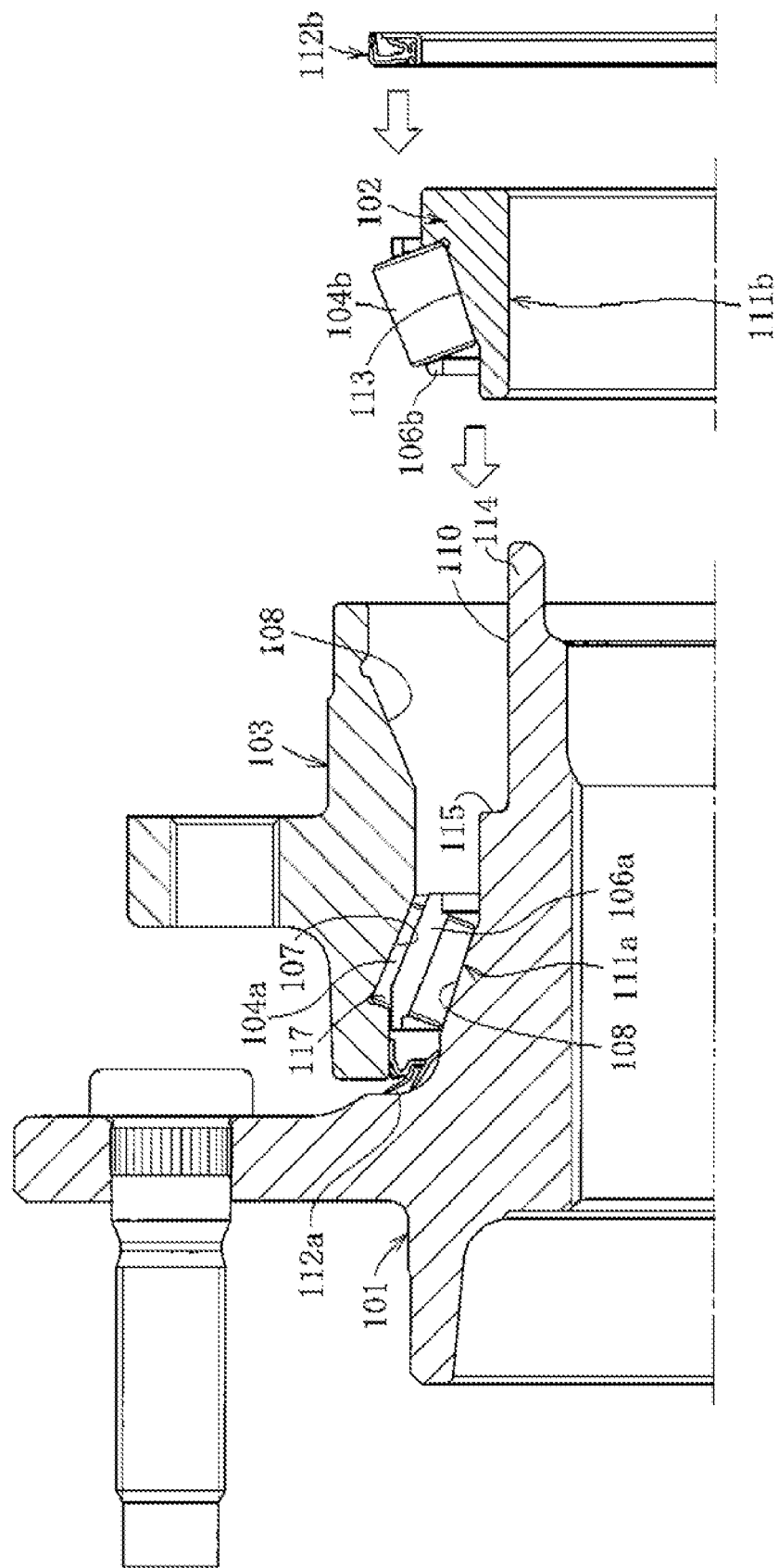
FIG. 11 is an enlarged main portion sectional view showing the conventional bearing device for a wheel as being assembled.
Figure 12:
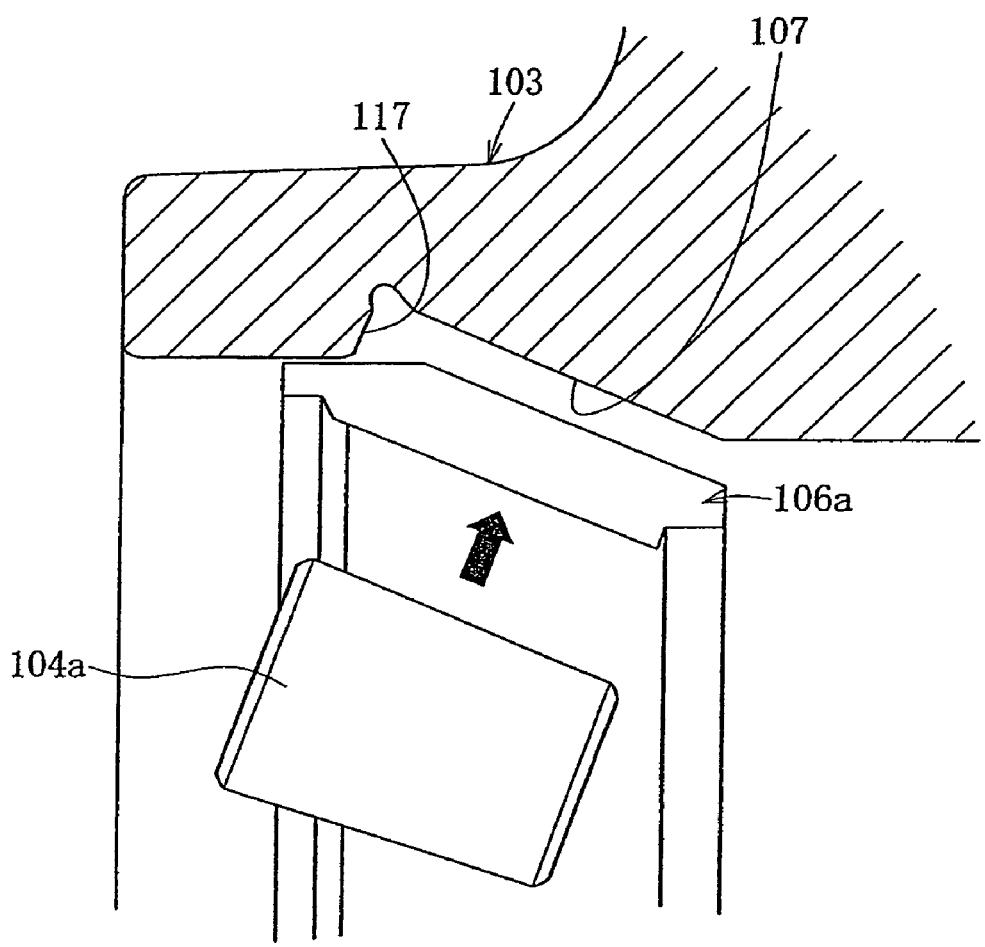
FIG. 12 is an explanatory view illustrating a problem in a process for assembling a conventional bearing device for a wheel.
Figure 14:
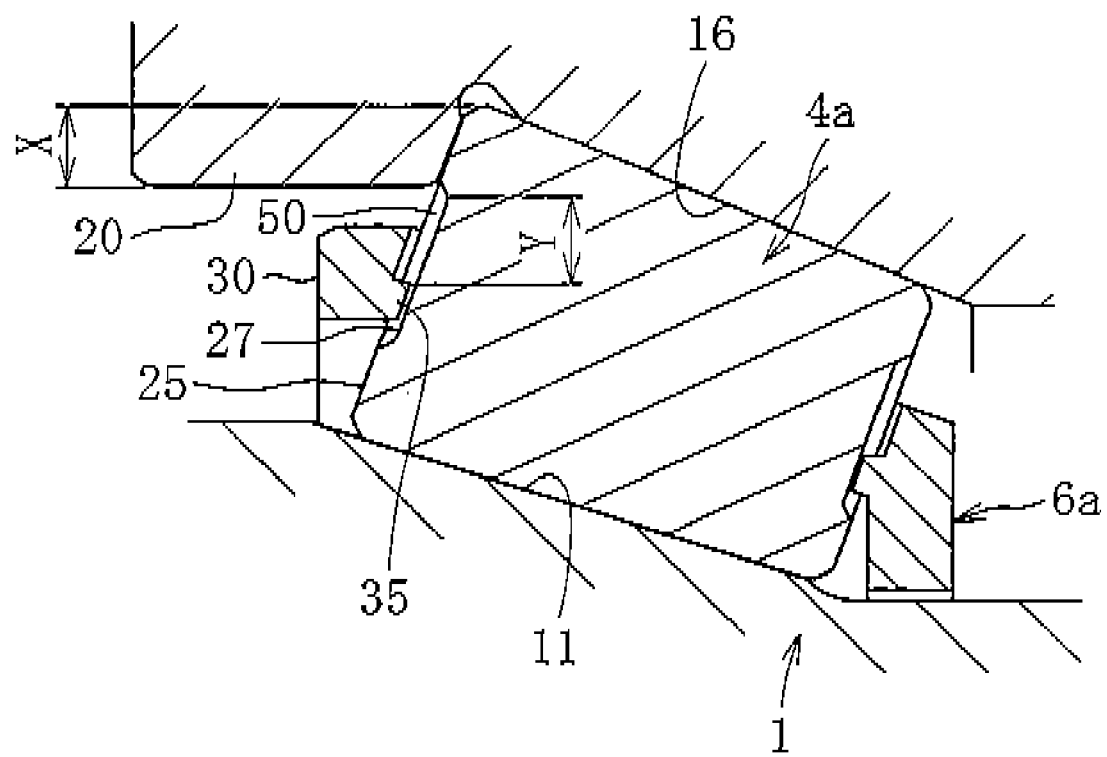
FIG. 14 is an enlarged main portion sectional view illustrating how the bearing device for a wheel is assembled.

As the hub ring 1 is inserted into the outer ring 3, the outboard side tapered rollers 4a are pressed outwardly by the inner race 11 of the hub ring 1, and the row of the tapered rollers 4a expands, with the result that the circumcircle diameter A thereof becomes larger than the inner diameter dimension B of the rib portion 20. As shown in FIG. 7, the tapered rollers 4a are brought into contact with the first outer race 16 of the outer ring 3, whereby each tapered roller 4a existing between the first outer race 16 and the inner race 11 of the hub ring 1, as shown in FIG. 14, is received at the normal position. As shown in FIGS. 7 and 14, the projections 35 are spaced apart from the outer peripheral wall surfaces of the recesses 27 by clearances 50. In the position shown in FIG. 14 (and FIG. 7), each clearance 50 has a radial width Y that is greater than or equal to a distance X, where X is the difference between a radius of the circumcircle (having the diameter A) of the row of the outboard side tapered rollers 4a and a radius corresponding to the inner diameter dimension B of the rib portion 20.

After that, the inner ring 2 is inserted into the inner side of the inboard side roller assembly 41, and is fit-engaged with the small diameter portion 8d of the hub ring 1. In this process, the tapered rollers 4b come into contact with the second outer race 17 of the outer ring 3 and the inner race 13 of the inner ring 2, and each tapered roller 4b is received at the normal position. In this state, the seal 24b is inserted, and then the inboard side end portion of the ring main body 8 is swaged from the outer side to form the swaged portion 15, whereby the assembly of the bearing device for a wheel is completed. During operation of the bearing, the large end surfaces 25 of the outboard side tapered rollers 4a and the large end surfaces 25 of the inboard side tapered rollers 4b come into contact with opposing rib surfaces 21 and 23, respectively, and the thrust force from the tapered rollers 4a and 4b is received by the rib portions 20 and 22.

Regarding the assembly method for the inboard side, it is also possible, as in the related art, to employ a step of first fitting the roller assembly 41 including the tapered rollers 4b and the retainer 6b onto the outer side of the inner ring 2, and then fit-engaging the resultant unit with the small diameter portion 8d of the hub ring 1.

In the bearing device for a wheel of this embodiment described above, radial relative movement is allowed between the outboard side tapered rollers 4a and the retainer 6a via the clearance 50. Thus, the circumcircle diameter A of the outboard side tapered roller row can assume a dimension not larger than (i.e., less than or equal to) the inner diameter dimension B of the rib portion 20, as shown for example in FIG. 6, and can assume a dimension larger than the inner diameter dimension B of the rib portion 20, as shown for example in FIGS. 7 and 14, so, even when the rib portion 20 is provided on the outboard side of the outer ring 3, it is possible to incorporate the outboard side roller assembly 41 into the outer ring 3, and, after the insertion of the hub ring 1 into the outer ring 3, the tapered rollers 4a can be moved outwardly to be received at the normal positions. Thus, it is possible to achieve an improvement in terms of assembly workability and productivity. Further, no complicated assembly device is required, thus contributing to a reduction in cost.

The embodiment of the present invention is described above, however, the present invention is not restricted to the embodiment described above but allows various modifications. For example, while in the above-mentioned embodiment the circumcircle diameter of the outboard side tapered rollers 4a prior to the insertion of the hub ring is smaller than the inner diameter dimension of the rib portion 20 of the outer ring 3, the cicumcircle diameter may be equal to the inner diameter dimension of the rib portion 20 of the outer ring 3. It is essential only that the roller assemblies 40 and 41 can be attached to the outer ring 3, and that the hub ring 1 can be inserted into the outer ring 3 to which the roller assemblies 40 and 41 have been attached.

Figure 13:
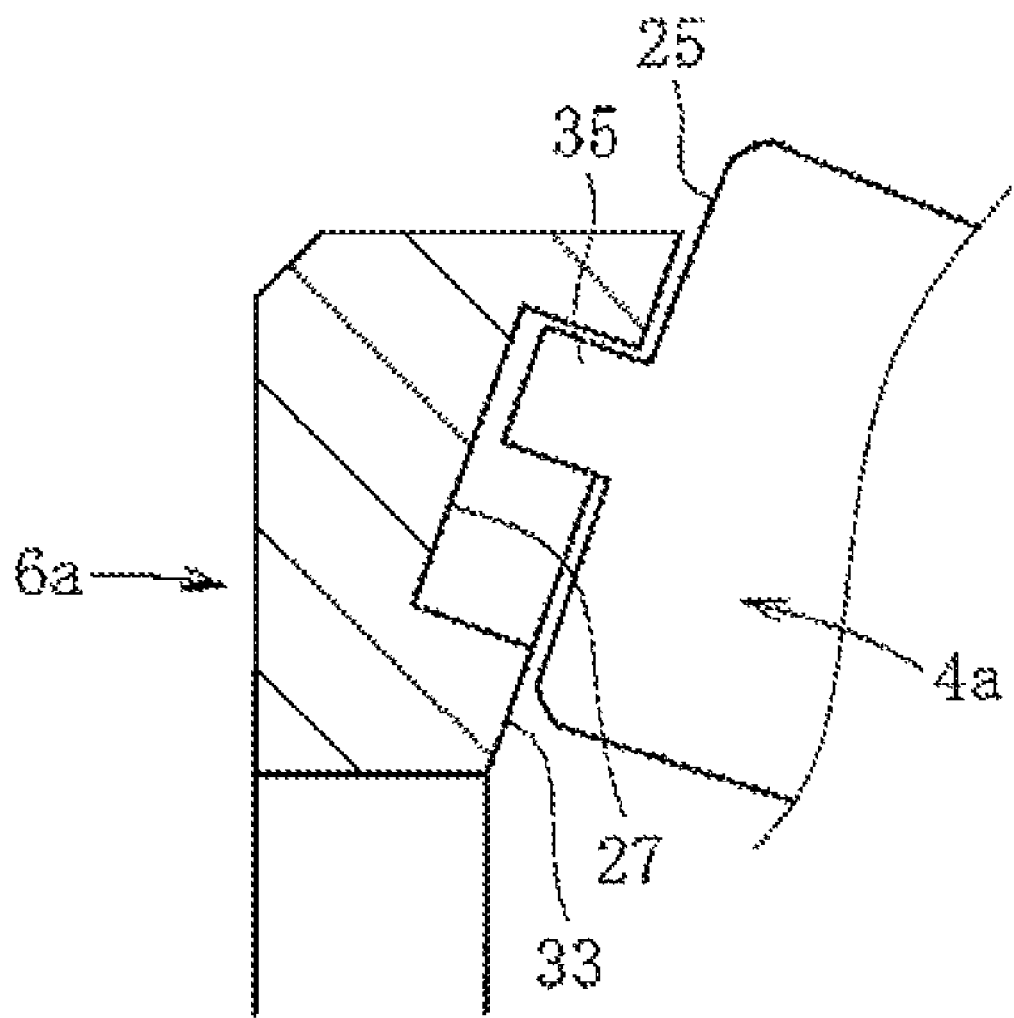
FIG. 13 is an enlarged sectional view illustrating a relationship between a projection provided on a tapered roller and a recess provided in a retainer.

Further, while in the above-mentioned embodiment the recesses 27 and 28 provided in the large end surface 25 and the small end surface 26 of each tapered roller 4a are circular, the configuration of the recesses 27 and 28 is arbitrary as long as the tapered roller 4a can move in the radial direction; it may also be a radially elongated elliptical configuration or a rectangular configuration; further, it is possible to adopt various other configurations, such as square and trapezoidal ones. Further, contrary to the above description, it is also possible to provide the projections 35 and 36 on the large end surface 25 and the small end surface 26 of each tapered roller 4a, forming the recesses 27 and 28 in the axial surfaces 33 and 34 of the retainers 6a and 6b, as shown in FIG. 13.

Further, while in the above description the recesses and 28 are also formed in the inboard side tapered rollers 4b, and the projections 35 and 36 to be fit-engaged with the recesses and 28 are provided on the retainer 6b retaining the tapered rollers 4b, such projections and recesses may be omitted in the inboard side roller assembly 41.

The invention claimed is:

1. A bearing device for a wheel, comprising:
   a hub wheel;
   an inner ring fitted onto the hub wheel;
   an outer ring;
   a plurality of outboard side tapered rollers provided between the outer ring and the hub wheel;
   a plurality of inboard side tapered rollers provided between the outer ring and the inner ring; and
   an outboard side retainer and an inboard side retainer having pockets retaining the outboard side tapered rollers and the inboard side tapered rollers, respectively, with a rib portion being provided on the outboard side of an inner peripheral surface of the outer ring,
   wherein for each outboard side tapered roller and corresponding pocket of the outboard side retainer, a projection is provided on one of an end surface of the outboard side tapered roller and a surface of the outboard side retainer which opposes the end surface, and a recess is provided in the other of the end surface of the outboard side tapered roller and the surface of the outboard side retainer which opposes the end surface,
   wherein relative movement in a radial direction is allowed between the outboard side tapered rollers and the outboard side retainer, wherein a diameter of a circumcircle of a row of the outboard side tapered rollers is larger than an inner diameter dimension of the rib portion,
   wherein for each outboard side tapered roller and corresponding pocket of the outboard side retainer, a clearance is formed between the projection and the recess for allowing radial inward movement of the outboard side tapered roller,
   and wherein each outboard side tapered roller is arranged such that Y is greater than or equal to X, where Y is a width of the clearance in the radial direction, and X is a difference between a radius of the circumcircle of the row of the outboard side tapered rollers and a radius of the inner diameter dimension of the rib portion.

2. A bearing device for a wheel according to claim 1, wherein an inner diameter dimension of a minimum inner diameter portion of the outboard side retainer is larger than an outer diameter dimension of an outer peripheral surface of the hub wheel opposed thereto.

3. A bearing device for a wheel according to claim 2, wherein an outer diameter dimension of a maximum outer diameter portion of the outboard side retainer is smaller than the inner diameter dimension of the rib portion of the outer ring.

4. A bearing device for a wheel according to claim 1, wherein an outer diameter dimension of a maximum outer diameter portion of the outboard side retainer is smaller than the inner diameter dimension of the rib portion of the outer ring.

* * * * *